(12) United States Patent
Watts

(10) Patent No.: US 6,988,754 B1
(45) Date of Patent: Jan. 24, 2006

(54) VEHICLE BUMPER

(76) Inventor: John Dawson Watts, 8301 Gutheire, Austin, TX (US) 78750-7852

( * ) Notice: Subject to any disclaimer, the term of this patent is extended or adjusted under 35 U.S.C. 154(b) by 0 days.

(21) Appl. No.: 10/935,585

(22) Filed: Sep. 7, 2004

(51) Int. Cl.
*B60R 19/20* (2006.01)
(52) U.S. Cl. .................................. 293/19; 293/107
(58) Field of Classification Search .......... 296/187.09, 296/189.11; 293/107, 102, 134, 135
See application file for complete search history.

(56) References Cited

U.S. PATENT DOCUMENTS

| 540,101 | A | * | 5/1895 | Kelly | 293/102 |
|---|---|---|---|---|---|
| 1,672,335 | A | * | 6/1928 | O'Meara | 293/107 |
| 2,196,225 | A | * | 4/1940 | Morrison | 224/490 |
| 2,274,440 | A | * | 2/1942 | Tozier | 293/134 |
| 2,358,481 | A | * | 9/1944 | Slack | 293/136 |
| 3,074,751 | A | * | 1/1963 | Gerin | 293/126 |
| 3,502,362 | A | * | 3/1970 | Eshelman | 293/134 |
| 3,603,633 | A | * | 9/1971 | Eshelman | 293/107 |
| 3,708,195 | A | * | 1/1973 | Kottsieper | 293/125 |
| 3,717,370 | A | * | 2/1973 | Walker | 293/107 |
| 3,845,977 | A | * | 11/1974 | Eshelman | 293/134 |
| 3,847,427 | A | * | 11/1974 | Eshelman | 293/107 |
| 3,848,736 | A | * | 11/1974 | Eshelman | 293/107 |
| 3,866,962 | A | * | 2/1975 | Eshelman | 293/134 |
| 3,977,713 | A | * | 8/1976 | Guin | 293/117 |
| 4,002,364 | A | * | 1/1977 | Eshelman | 293/143 |
| 4,099,760 | A | * | 7/1978 | Mascotte et al. | 293/115 |
| 2005/0035608 | A1 | * | 2/2005 | Larsen et al. | 293/107 |

* cited by examiner

*Primary Examiner*—Jason Morrow

(57) ABSTRACT

A cost effective bumper for a vehicle is provided that develops maximum resiliency of an inflated spare wheel to dampen shock of impacts so as to reduce injury to the occupants and reduce repair cost of the vehicle, without need for additional parts or cost. The bumper is especially suited to increase the safety of small automobiles, and storage of the spare wheel in the bumper assembly gives added room in the luggage compartment. The introduction of Hybrid power plants for small automobiles allows timely opportunities for new placements of engine components, to best accommodate the bumper assembly of the present invention.

19 Claims, 2 Drawing Sheets

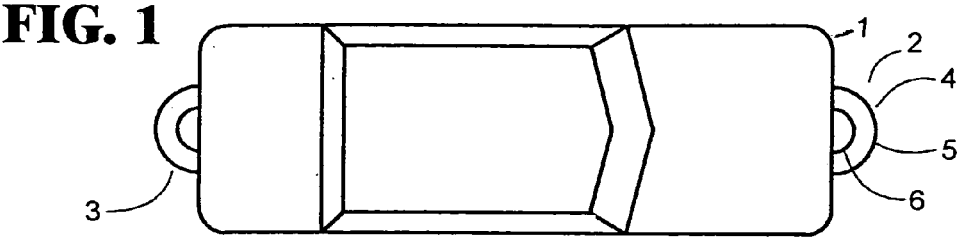
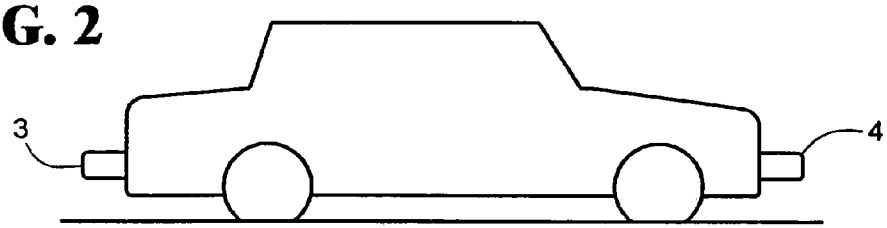
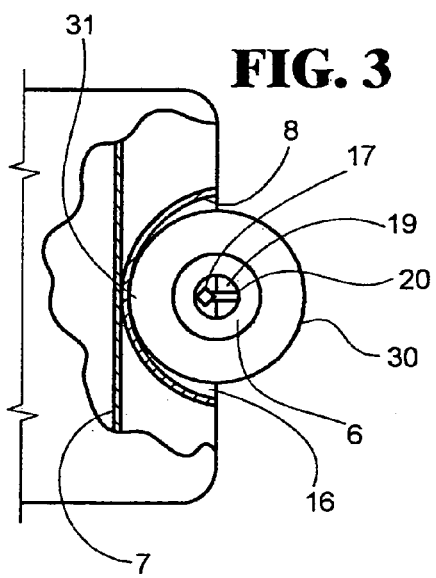
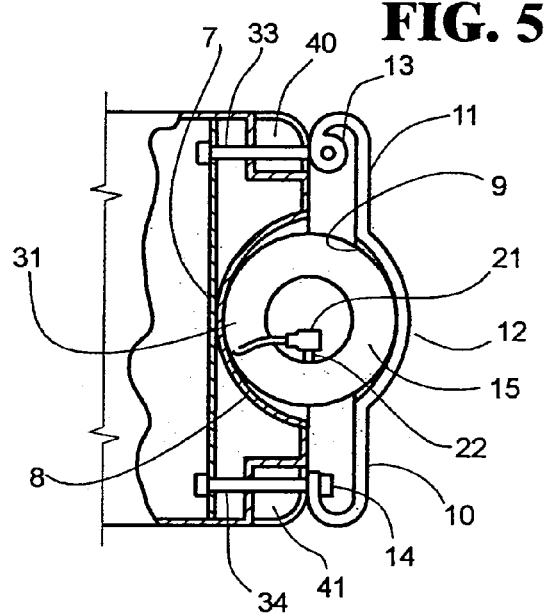
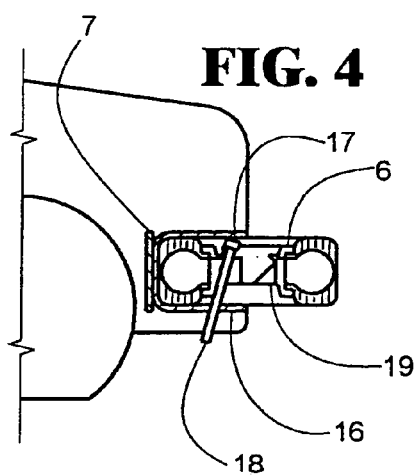
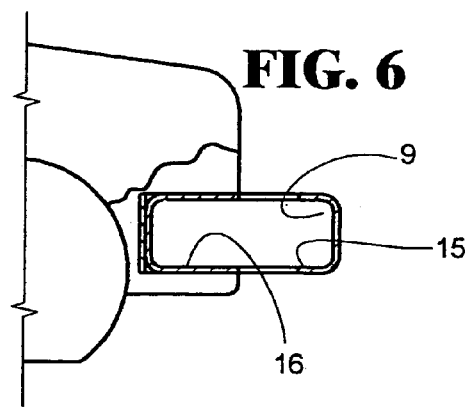

VEHICLE BUMPER

FIELD OF THE INVENTION

Vehicle passenger safety has been brought into sharp focus during recent years by the passage of Federal Regulations to make automobiles safer. Such regulations have made seat belts and improved bumpers mandatory, so as to reduce death and injury of passengers, with secondary but parallel interests of reducing costs of injuries and vehicle repairs, which have driven automobile insurance rates to all time highs. All affected parties benefit from safety measures that are both practical and reasonable in cost, as exemplified by seat belts which have been proven both effective and affordable. Numerous other proposals have been tried which were not effective and/or were excessive in cost. Presently, affordable impact dampening means that can substantially reduce injury to the occupants and reduce damage to the vehicle, are not available to the average vehicle owner.

BACKGROUND ART

Vehicle impact dampening devices now in use can be classified as (1) conventional spring metal bumpers (2) bumpers mounted on hydraulic shock absorbers, or as (3) designs that dampen impact by crumpling car bodies into twisted masses of metal. Federal Standards specify that a bumper must dampen impact without substantial damage to a vehicle traveling five miles an hour when it hits "an immovable object" which may have advantages in parking lots, but most accidents occur at speeds far in excess of five miles an hour, so such bumpers do not give adequate protection to the vehicle or the passengers. The crumpling of a car body to absorb shock obviously defeats efforts to reduce costs of repairs and the same is true for existing hydraulic shock absorbers, but is less obvious because in order to dampen impact the absorber must "stroke" and in doing so, the bumper and front of the car must move relatively to the rest of the car. Such movement in turn, typically results in the front parts such as the grill and fenders being made of plastic in the hope that they will return to their original shape. Such plastic parts are much weaker than the metal parts they replace, so they can not dampen nearly the amount of impact that the metal parts did, which defeats the dampening afforded by crumpling of metal parts. Therefore, use of hydraulic shock absorbers can result in even more danger to the passengers rather than less. In addition, the plastic parts are less durable than the metal parts they replaced which defeats the savings intended. The air bag has reduced injury in some cases but due to its explosive nature and accidental inflations, many injuries and deaths have been caused by it, so for the net effect they afford, the air bag solution is very questionable relative to both safety and economy. Applicant believes that there is an urgent need for better means to protect drivers, passengers, and vehicles at a cost that all citizens can afford. Curtis' U.S. Pat. No. 5,106,137 is the closest reference found by applicant, which teaches use of a new special air cushion mounted with a conventional bumper with an impact-activated embodiment as described in Co. 3, lines 34–55 and a pre-charged embodiment described in Col 4, lines 35–39. The present invention teaches improvements over Curtis as follows: (1) No additional parts that add cost and weight to the vehicle, as are required by Curtis. (2) Because numerous vehicle bumpers now in use comprise vertical extensions that project outwardly and vertically from the bumper so as to mate with other bumpers of different heights, Curtis' bumper cannot absorb enough of a concentrated impact load to be useful, because a concentrated load from the vertical extension would stroke only a minute lateral portion of his air bag and therefore, dampen very little impact. (3) The Curtis air bag either requires recharging per his first embodiment, or is limited to a very short stroke equal to the depth of the airbag per his second embodiment, precluding dampening of much impact force. (4) An impact force applied to Curtis' bumper will generate an extremely high pressure in the air bag due to its very short stroke, that must be retained without rupture by means of fascia (20) and the upper and lower walls of cavity (32) which must be flexible to allow flexing of airbag (30) as required to dampen any impact force. Vans and trucks have for many years, mounted their spare wheel parallel to the back of the vehicle by means of bolting its hub to a mounting member, but such a mounting affords virtually no dampening capacity for the vehicle because any substantial force against the wheel will engage the tire sidewall and break the pneumatic seal between the tire and hub, and immediately contact the hub which delivers almost the full impact to the vehicle body.

DISCLOSURE OF THE INVENTION

The present invention comprises an improved bumper to dampen impacts that may be imposed on an end of a vehicle so as to better protect its occupants and to minimize damage to the vehicle by retarding outflow of the fluid or by use of a "dampening member" of sufficient displacement and stroke length sufficient to dampen impacts by slowing outflow of the fluid or by compression of the fluid. Two examples of the "dampening member" are a large hydraulic shock absorber, or as in the first three embodiments described below it may be a "wheel", such as a conventional hub assembled together with a pneumatic tire and properly inflated with air. To practice my invention, one or more wheels may be mounted with an end of the vehicle, such that an impact force applied at that end will be transmitted and substantially dampened through the spare wheel before the force is transmitted to the vehicle body. "Body" shall mean any portion of the vehicle inboard of the bumper. Were the wheel hub mounted rigidly with the body, it could dampen only a fraction of the impact that it could dampen if the hub was allowed to move with the tire per the present invention. Therefore, for the wheel of the present invention to dampen maximum impact force, the hub is supported by and allowed to move freely with the tire, in the direction that the impact force is transmitted through the wheel. The bumper is arranged and positioned such that one tire surface area defined as the "input zone" receives the impact force directly or through another member, and another tire surface area defined as the "output zone" delivers a dampened force to the vehicle directly or indirectly through another member. Such zones may comprise only a portion of the tire tread area, only a portion of the tire sidewall area, or they may comprise a portion of both tire tread area and tire sidewall area as best applies to a specific bumper design. Embodiments of the present invention may transmit force through the wheel in a direction parallel to the plane of the wheel, parallel to the wheel axis or in a direction intermediate there between.

A flat surface can not transmit as much force to a tire as can a curved surface that is contoured to best cooperate with the tire input zone, nor can a tire transmit as much force to a flat surface as it can transmit to a curved surface contoured to best cooperate with the tire output zone. Therefore, although it is not mandatory to practice my invention, it is recommended that the surfaces that the input and output zones cooperate with, be curved. An "input pocket" may be formed to cooperate with the input zone, and an "output pocket" may be formed to cooperate with the output zone so as to transmit and dampen the desired increased magnitude of force without damage to the tire. Such curved surfaces of the pockets may be formed with radii slightly greater than the tire radii in both directions, the radii of the tire periphery around its axis and normal thereto. Thus, as a zone deforms responsive to application of an impact force from or to a pocket, the zone restrains the tire from excessive deformation sufficient to damage the tire, such that increased expansion of the tire away from the zones will occur, which increases total dampening capacity of the bumper. The output pocket may be attached to the vehicle immediately inboard of the space where the spare wheel is to be mounted, and an input pocket may be mounted immediately outboard of that space, such that the input pocket can receive impacts and transmit them through the wheel which in turn, delivers a more dampened impact force to the output pocket and thence to the vehicle, without damage to the tire. In anticipation that the input pocket may receive an impact force greater than the dampening capacity of the tire, the input and output pockets may be designed and spaced to abut each other and crumple as an impact load exceeds the bumpers rated dampening capacity, so as to add even more dampening capacity to the assembly and thereby, better protect the vehicle and occupants and at the same time, restrict crumpling to less expensive parts so as to reduce repair costs.

The spare wheel may be supported by such as a shelf, a hinge, a drawer, a lever or other device such that the wheel may be installed or removed for inspection, repair or replacement with minimum effort and time. Such a device may be fitted with a conventional lock to secure the wheel in best position to absorb shock and to prevent its theft. So as to be able to monitor the air pressure within the spare wheel, any suitable current or future air pressure monitoring device may be utilized so as to alert the driver, should the air pressure within the spare wheel not be within the desired range.

If the invention is mounted with the front end of the vehicle, it will absorb shocks against objects that the vehicle may run into, and if it is mounted with the rear of the vehicle it will absorb shocks from other vehicles that impact its rear end. The other end of the vehicle may be fitted with a conventional spring bumper or if desired, a second bumper in accord with the present invention may be mounted with the other end also. However, if the front end of all vehicles were fitted with the present invention, then the need for one on the rear would be greatly reduced because the bumper of the rear vehicle would dampen the shock it delivers to the vehicle in front. Also, when my bumper is mounted on the front, the shock absorbing capacity will be proportional to the weight of the vehicle imparting the impact, which improves both safety and cost savings. The normal ratio of a vehicle wheel dampening capability to the vehicles weight, provides a reasonably constant relative shock absorbing capacity for the present invention when used on any vehicle, which according to applicants calculations, is substantially greater than the relative dampening capacity of any bumper now available. The trend to smaller vehicles due to the rising cost of fuel will make the present invention even more advantageous because lighter vehicles are more fragile, so they need greater protection. The trend toward low profile tires will accentuate the need for pockets as described herein, so as to increase the impact dampening capacity of such tires.

After my bumper has been impacted and forced inwardly, a return stroke will begin due to the resilience of the inflated wheel. Therefore, to prevent too rapid a return stroke which could cause an unwanted reverse acceleration of the lighter vehicle, the return stroke may be slowed to a desirable speed by such as by a small conventional hydraulic shock absorber.

Lifting of the spare wheel to or from said wheel support near bumper height, will be much easier than lift of the wheel into and out of a conventional automobile trunk, because lift of a wheel into a trunk as now practiced, puts the drivers back in a very poor position for lifting a heavy weight, and usually many items must be removed from and replaced within the trunk. Therefore, a significant number of back injuries may be prevented when flat tires force motorists to change wheels on the side of the road. Along with the trend to smaller cars is the consideration of adequate trunk space and the present invention will increase trunk space for luggage and such, because it stores the spare tire in the bumper instead of in the trunk. Some pneumatic tires have inner tubes and some do not, whereon they seal between the tire and the hub however, either may be used to practice the present invention.

BRIEF DESCRIPTION OF THE DRAWINGS

FIG. 1. Depicts a top view of a vehicle fitted at each end with a First Embodiment of the present invention.

FIG. 2. Is a side view of FIG. 1.

FIG. 3. Is an enlarged fragmentary horizontal section of one end of FIG. 1.

FIG. 4. Is a vertical section of FIG. 3.

FIG. 5. Is similar to FIG. 3, but depicts a Second Embodiment of the present invention.

FIG. 6. Is a vertical sectional of FIG. 5, showing details of the pockets.

DESCRIPTION OF PREFERRED EMBODIMENTS

Figure 7:
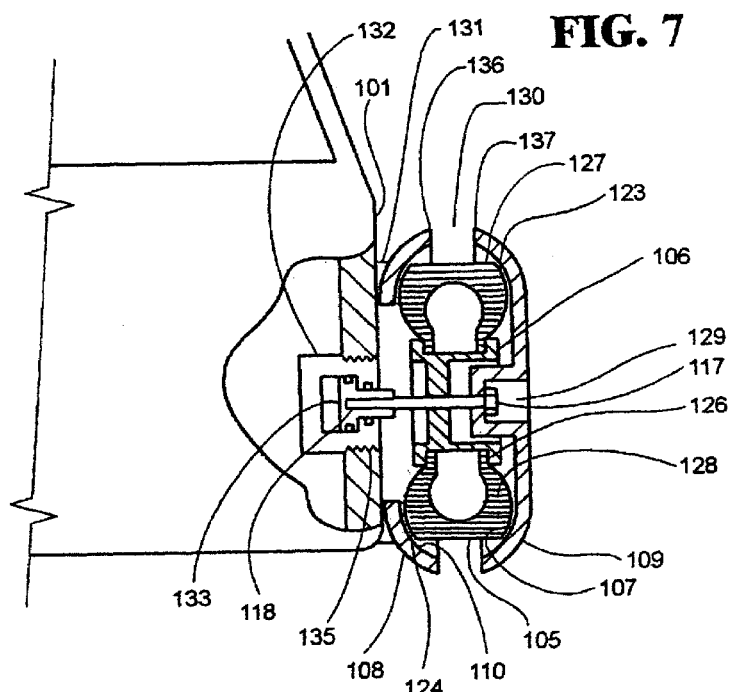
FIG. 7. Is a fragmentary vertical section of a Third Embodiment of the present invention.
Figure 8:
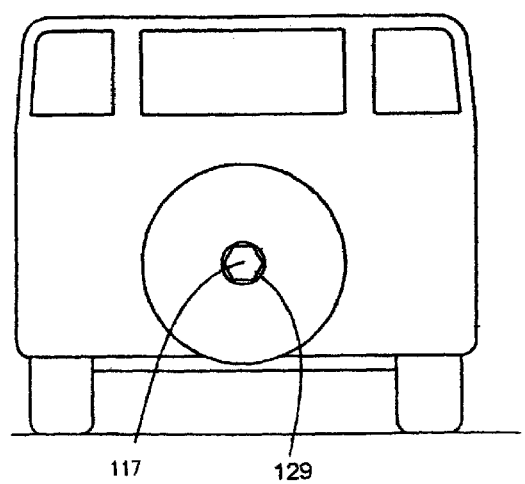
FIG. 8. Is an end view of FIG. 7.
Figure 9:
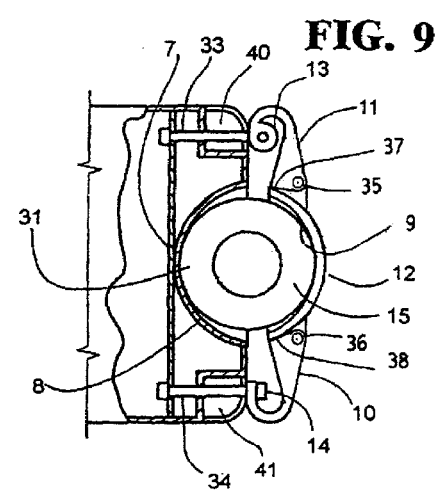
FIG. 9 depicts an alternate construction of the beam shown in FIG. 5.

A First Embodiment of the present invention is depicted in FIGS. 1–4 wherein a passenger car (1) is fitted with a basic version of a bumper assembly in accord with the present invention, wherein the bumper is mounted at both at the front end as at (2) and at the rear end as at (3) so as to dampen impacts on either end of the car. All description hereafter should be understood as being applicable to the invention being mounted at either the front or rear end, or both. Wheel (4) comprises pneumatic tire (5) assembled together with hub (6) and inflated with air pressure to absorb impacts the car may be subjected to. In a first embodiment shown in FIGS. 1–4, the impact force is received directly by the tire on outwardly projection input zone (30) of the tire surface, and a dampened force is delivered to the vehicle by the diametrically opposite surface of the tire, output zone (31). FIG. 3 depicts the wheel being mounted such that input zone (30) will project from the end of the car a distance at least equal to the amount of compression that the wheel can withstand across its diameter without damage, so the wheel will absorb the maximum impact that it can withstand. Any suitable member (7) mounted with the vehicle body is positioned so as to receive a dampened force from output zone (31) on the tire surface. The hub is not mounted directly with the vehicle, but is supported by the tire so it can move freely with the tire in the direction of impact so as to maximize the ability of the wheel to dampen impacts. Wheel (4) is preferably mounted in a generally horizontal position at conventional bumper height so as to interact with bumpers of other vehicles. Generally horizontal is defined as the plane of the spare wheel forming an angle within forty-five degrees with the road surface. This Embodiment may selectively include any or all features of the embodiments described below. As depicted in FIGS. 3 and 4, pocket (8) may comprise lower wall (16) which extends outwardly enough to support wheel (4) immediately after it is lifted and placed into pocket (8). Bolt (17) which cooperates with internal threads (18) formed in lower wall (16) of the pocket, is positioned so as to pull downwardly and inwardly on hub (6) acting through adapter (19) as the bolt is tightened, so as to firmly urge tire output zone (31) into and against pocket (8). Adapter (19) is slotted outwardly from bolt (17) as at (20) such that wheel (4) cannot move outwardly after installation, but can move inwardly in response to an impact on tire input zone (30). Conventional locking means may be provided for bolt (17) so as to prevent theft of the wheel.

A Second Embodiment is depicted in FIGS. 5 and 6 wherein output pocket (8) is attached to member (7) and positioned so as to receive output zone (31) and support the wheel in a position to best transmit and dampen impact forces. The interior surface of pocket (8) is contoured generally complimentary to output zone (31), but with larger radii than the tire zones in both the plane of the tire and perpendicular thereto, so as to limit deformation of the tire during impact and thereby, develop maximum dampening capability of the wheel without damage to the tire. Input pocket (9), similar in internal contour to output pocket (8), may be mounted snuggly against input zone (30) so as to receive impact forces and transmit the force to input zone (30) with the same advantages as described for output pocket (8). The housing of input pocket (9) may extend laterally from both sides as at (10) and (11) so as to form load beam (12) across that end of the car, with extension (11) being hinged to the car as at (13) and extension (10) being reversibly attached to the car body as at (14). Lower wall (15) of pocket (9) extends sufficiently to support the outer portion of wheel (4) by contact with input zone (30). Thus, the wheel may be lifted and placed into pocket (8) and supported by lower wall (16) while beam (12) is pivoted on hinge (13) such that pocket (9) contacts and supports the wheel through contact with the input zone of the tire, while reattachment of extension (10) is made with the chassis as at (14), such that tightening of attachment (14) will load the tire resiliently between the input and output pockets so as to secure the assembly against loosening and rattling. Attachment (14) may comprise a bolt or any suitable conventional locking means that will reversibly secure it in operating position. Beam (12) is made strong and rigid so as to withstand any impact force within the load rating of the bumper. So as to prevent un-dampened impact forces from being exerted on hinge (13) or attachment (14), they are mounted with bolt (33) and bolt (34) into recesses (40) and (41) respectively, the bolts being mounted so as to slide relative to the car body and freely move inwardly, but not outwardly from the installed position depicted in FIG. 5. The bolts are mounted in tension between the body and beam (12) so as to urge pocket (9) against input zone (30). Thus, should an impact occur against either side of the beam, it will not transmit a compressive force directly to the chassis because the bolt on that side will slide inwardly, and the beam will pivot around its opposite end, placing the bolt at that end in tension, and transmit the impact through the tire, such that impact on any portion of beam (12) is dampened before delivery to the body. Without departing from the spirit of the invention, beam (12) may be constructed with extensions (10) and (11) being hinged to pocket (9), so as to allow inward movement of the pocket responsive to a centermost impact, without causing inward movement of hinge (13) or attachment (14), but having rotation stops to prevent inward movement of hinge (13) or attachment (14) without inward movement of pocket (9).

A Third Embodiment is depicted in FIGS. (7 and 8) wherein the wheel comprises pneumatic tire (105) mounted on hub (106) and pressurized with air, the wheel being mounted with an end of vehicle body (101) as at (131) such that the plane of the wheel is positioned generally vertically wherein generally vertically is defined as the plane of the wheel being positioned within 45 degrees of a vertical plane. Input zone (123) and output zone (124) of the tire each comprise a portion of their respective sidewall sufficiently radially outboard the hub so as to allow flexure of tire wall (128) without causing disengagement of sealing contact as at (126) between the tire and hub. Input zone (123) and output zone (124) may also comprise a portion of their adjacent tire periphery as at (127), the zones being sufficiently away from the centermost plane of the tire so as to allow clearance gap (130) between the input and output pockets during impact of the bumper. Inner surface (107) of input pocket (109) is formed to contact input zone (123) of tire (105) and the inner surface (110) of output pocket (108) is formed to contact output zone (124) as described above for the first embodiment, so as to maximize the impact dampening capacity of the wheel. Bolt (117) having threads to cooperate with threads (118) formed in any suitable member of the vehicle body, retains the wheel and input pocket in operating position, while allowing their movement toward the vehicle body in response to any impact force that may be applied on pocket (109). The depth of recess (129) formed at the center of pocket (109) and the width of gap (130) between pocket faces (136) and (137) is of sufficient dimension such that pocket (109) can move toward pocket (108) without contact between the pockets until after the full impact rating of the assembly is absorbed. To prevent too rapid a return of the input pocket after an impact is dampened, a small conventional hydraulic shock absorber (132) having body (135), and piston (133) which is connected to bolt (117) by means of threads (118) formed in the piston so as to prevent too rapid a return of pocket (109) after an impact is absorbed. Any embodiment may be provided with a conventional air pressure sensor (21) connected to the valve stem of the tire as at (22) in FIG. 5 so as to sense the air pressure within the wheel and to activate any suitable alarm to alert the motorist, should the pressure not be within the desired range.

Without departing from the spirit and scope of the invention, other embodiments may include additional devices such as cams, levers or pistons to direct impact forces to the input zone as may be necessary to practice the invention with the wheel in alternate positions, and more than one wheel may be used as part of a bumper. Any dampening member, as mentioned in the first paragraph above, may be used with novel features of the present invention in any combination, without departing from the spirit and scope of the present invention.

I claim:

1. An impact dampening bumper (1) for a vehicle, comprising: a hub (6) mounted with a pneumatic tire (5) and inflated to form a wheel (4), the wheel being mounted with an end of a vehicle body (1) such that an impact force imposed on the vehicle at that end will be transmitted through the wheel and be substantially dampened before the dampened force is transmitted to the vehicle body; tire (5) having an input zone (30) on the tire surface within which, the impact force is applied to tire (5); the tire having an output zone (31) on the tire surface, within which the tire transmits the dampened force toward the vehicle; the output zone (31) being positioned substantially on the opposite side of the tire surface from where the input zone is located; an input pocket (9) formed and positioned to cooperate with the input zone (30); an output pocket (8) being formed and positioned to cooperate with the output zone (31); the pockets being formed so as to substantially increase the impact dampening capacity of the tire from what would be attainable were the pockets a flat surface.

2. The bumper of claim 1, further comprising: the wheel (4) being a spare wheel for the vehicle, such that it may be temporarily used to replace a damaged wheel that the vehicle has been traveling on.

3. The bumper of claim 1, further comprising: the hub (6) being mounted with the tire (5) such that the hub moves with the tire and transmits no substantial force from the hub directly to the vehicle.

4. The bumper of claim 1, further comprising: the wheel (4) being mounted with an end of the vehicle so the input zone (30) extends beyond the end of the vehicle, such that an impact force applied at that end would act upon input zone (30).

5. The bumper of claim 1, further comprising: the plane of the wheel (4) being positioned substantially horizontally.

6. The bumper of claim 1, further comprising: the plane of the wheel (4) being positioned substantially vertically.

7. The bumper of claim 1, further comprising: the input pocket (9) formed to cooperate with the input zone (30) and positioned so as to receive and transmit impact forces to the input zone (30) without damage to the tire, the impact force being greater than the force that a flat surface could transmit to the tire without damage to the tire.

8. The bumper of claim 1, further comprising: the output pocket (8) formed to cooperate with the output zone (31), and positioned so as to receive and transmit a dampened impact force from the output zone (31) to the vehicle body without damage to the tire, the impact force being greater than a force that a flat surface could receive from the tire without damage to the tire.

9. The bumper of claim 1, further comprising: the pockets (8) and (9) being contoured with radii greater than corresponding tire radii measured in the plane of the tire; the pockets being contoured with radii greater than corresponding tire radii measured ninety degrees from the plane of the tire; the pocket radii being dimensioned so as to increase the force the tire can transmit between the pockets without damage to the tire.

10. The bumper of claim 1, further comprising: the input pocket (9) having a lateral extension (10) on one side and a lateral extension (11) on the other side, the extensions extending substantially to the full width of the vehicle; the lateral extension (11) on the other side having a hinge (13) attached to the vehicle body; extension (10) having a reversible attachment (14) for attaching the extension (10) on one side to the vehicle body such that the input zone will cooperate with the input pocket to support and securely retain the wheel in operating position.

11. The bumper of claim 9, further comprising: the output pocket (8) being mounted with the vehicle body so as to receive and cooperate with the output zone (31) so as to transmit the dampened impact force to the vehicle body; the input pocket (9) being mounted with the bumper so as to receive and cooperate with the input zone (30) so as to transmit the impact force to the tire (5); the pockets (8) and (9) being sufficiently strong to hold the wheel (4) in operating position and support its weight.

12. The bumper of claim 10, further comprising: the input pocket (9) together with the extensions (10) and (11) forming a load carrying beam (12) which extends across the width of the vehicle, the beam being sufficient in strength and being mounted so as to receive lateral impacts against any portion of beam (12); such that the impact causes the beam to pivot about its end more distant from the point of impact, and thereby direct loads received on any portion of the beam through wheel (4) so as to dampen impact forces before they are transmitted to the vehicle.

13. The bumper of claim 12, further comprising: the beam (12) having a compression stroke toward vehicle (1) while receiving an impact load, and a return stroke urged by the resiliency of the inflated tire (5) after the impact load is transmitted; a hinge (13) and a reversible attachment (14) being mounted with the vehicle body through bolts (33) and (34) that are installed with relatively light tension loads, the bolts being mounted so as to slide relative to the vehicle from installed position in the direction of impact, but not able to slide from installed position against the direction of impact, such that the wheel is loaded in slight compression by tightening of the attachment (14) and held in place by the resiliency of the inflated tire (5); such that the hinge (13) and the reversible attachment (14) may move freely toward the vehicle when impact loads are imposed on their respective side of beam (12).

14. The bumper of claim 1, further comprising: the input zone (30) being located sufficiently far from hub (6) such that flexure of the tire walls caused by application of the impact force, will not disturb the pneumatic seal as at (6) between the tire and hub.

15. The bumper of claim 14, further comprising: the bumper assembly being mounted with the end of the vehicle body (101) with the plane of the wheel in substantially vertical position; pockets (108) and (109) being formed complimentary to sidewalls of the tire and a portion of the tire tread, but not extending to the center plane of tire (105).

16. The bumper of claim 15, further comprising: the input pocket (109) having a hole formed near its center so as to provide a sliding fit for the retainer bolt (117) that extends inwardly toward the vehicle to cooperate with screw threads (118) formed within any suitable member mounted with the vehicle, to engage the bolt threads such that the bolt (117) may be inserted through the hole to engage the threads (118) and then be tightened so as to draw the input pocket (109) inwardly against the tire (105) which then nests in and is forced against output pocket (108) with sufficient force to secure the assembly in operating position without tendency to loosen or rattle.

17. The bumper of claim 16, further comprising: the bolt engaging threads (118) being formed in the piston (133) of a conventional shock absorber (132); a body (135) of the shock absorber being mounted with the vehicle body; the piston (133) being mounted against outward motion from the installed position but not restrained against inward motion, such that the shock absorber does not act against inward motion of the bolt (129) as impact forces are applied; such that after impact forces are dissipated, return of the input pocket is slowed.

18. The bumper of claim 15, further comprising: a periphery (136) of the output pocket (108) and a periphery (137)

of the input pocket (109) extending axially toward each other over portions of the tire tread sufficiently to restrain the tire from excessive radial expansion in response to an impact load applied to the input pocket; a gap (130) between the pockets, when in the installed position, being substantially equal to the distance that input pocket (109) will stroke when the rated load of the bumper is dampened; the peripheries of the input and output pockets (136 and 137) being designed and positioned so as to absorb and further dampen overloads in excess of the rated load.

19. The bumper of claim 12, further comprising: the extensions (10, 11) being hinged to the input pocket (9) by hinges (35, 36) so as to allow inward movement of pocket (9) responsive to a centermost impact, without causing inward movement of the hinge (13) or the attachment (14); rotational stops (37, 38) being positioned to prevent inward movement of either extensions without inward movement of pocket (9).

* * * * *